Nov. 14, 1961 G. H. BARNES 3,009,070
BI-DIRECTIONAL CURRENT DRIVER
Filed Dec. 30, 1958

| | | TRANSISTORS | | | |
|---|---|---|---|---|---|
| | | 10 | 20 | 30 | 40 |
| CASE | I | ON | OFF | OFF | OFF |
| | II | ON | ON | OFF | OFF |
| | III | OFF | OFF | ON | OFF |
| | IV | OFF | ON | OFF | ON |

*INVENTOR.*
GEORGE H. BARNES
*BY* Francis A. Varallo
AGENT

United States Patent Office 3,009,070
Patented Nov. 14, 1961

3,009,070
BI-DIRECTIONAL CURRENT DRIVER

George H. Barnes, Berwyn, Pa., assignor to Burroughs Corporation, Detroit, Mich., a corporation of Michigan Filed Dec. 30, 1958, Ser. No. 783,935
7 Claims. (Cl. 307—88.5)

Figures 1, 2:
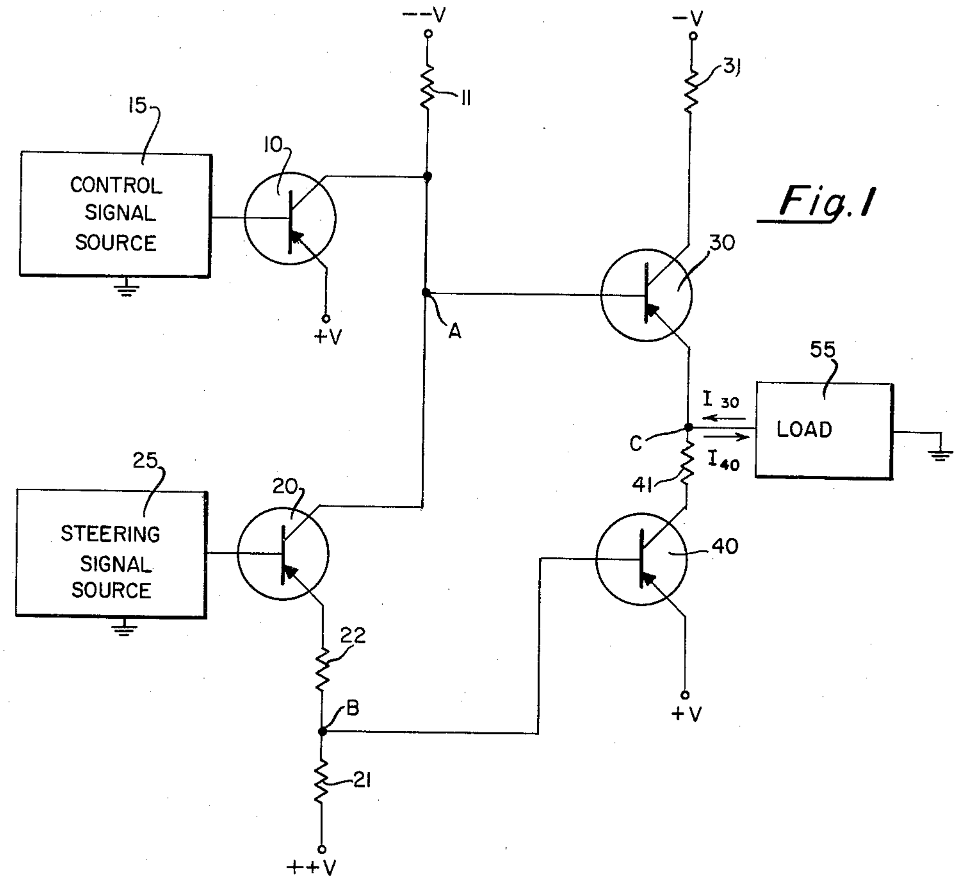

This invention relates to pulse forming circuits and more particularly to driving circuits for providing bi-directional current pulses.

The present circuit drives current in either direction through a load circuit upon command of an input steering signal—the time of occurrence and the duration of the current flow being directed by a second input control signal. The versatility implied in the aforementioned characteristics reflects the general utility of the instant driver circuit in a variety of applications. Such applications include the testing of magnetic elements, mechanization of logical functions in computing equipment, actuation of polarized relays and the operation of memory devices utilizing magnetic cores with substantially rectangular hysteresis characteristics.

In the latter application, the so-called "word-organized" magnetic-core matrix memories require a source of "information write current" for each core plane matrix of the memory. This information current flows in a predetermined direction through a single wire threading all of the cores on a common plane. A second current designated simply as "write current" flows currently with said information write current through a second multiplane common winding threading all the digit cores of a single binary word. In practice the write current is designed to be two-thirds of the current necessary to switch a magnetic core from one remanent state to the other, while the information current has an absolute value of one-third of the required switching current. Depending upon the polarity of the information current, the magnetomotive force (M.M.F.) applied to each of the cores by the information current either aids or opposes the M.M.F. supplied by the write current flowing through said cores. In the former case the full switching M.M.F. is supplied to switch the selected cores from an original stable state to a preselected stable state, in the latter case, only one-third of the switching M.M.F. is available to switch the selected cores and these remain in their original stable states. The present circuit is admirably suited for the role of information current driver.

Although not limited thereto, a preferred embodiment of the instant invention utilizes junction transistors of the same physical properties and combines the inherent advantages of solid state electronic components with those of the circuit configuration.

The basic circuit comprises four transistors. Two of the transistors are the actual current drivers and provide respectively current flow in opposite directions through the load. The third transistor performs a steering function. In response to a steering signal applied thereto, this latter transistor determines which of the drive transistors will supply current to the load, thereby establishing the polarity of load current. The fourth transistor controls the driver circuit operation. Control signals applied to this transistor determine the start and duration of the current pulse delivered to the load—this control function being completely independent of the state of the steering transistor.

Accordingly, it is a general object of the present invention to provide an improved pulse forming circuit for supplying bidirectional current to a load.

Another object of the invention is to provide a current driver for use in word-organized magnetic-core matrix memories.

A further object of the invention is to provide a driver circuit which utilizes exclusively solid-state electronic components and which has the combined advantages of simplicity, economy and efficiency.

A more specific object of the invention is to provide a bidirectional current driver having steering means for determining the direction of current flow and independent control means for determining the start and duration of said current flow.

These and other features of the invention will hereinafter become more fully apparent from the following description of the annexed drawings, which illustrate a basic embodiment, and wherein:

FIG. 1 is a circuit diagram of the bidirectional current driver of this invention; and FIG. 2 is a chart representing the disposition of the active elements of the current driver for various cases encountered during circuit operation.

Referring now to FIG. 1, there is shown an embodiment of the invention comprising four PNP transistors, designated 10, 20, 30 and 40 respectively. Transistors 30 and 40 are the drive transistors for supplying current to the load 55. Transistor 20 is the steering transistor for selecting the appropriate drive transistor; and transistor 10 is the circuit control transistor. Conventional graphical symbols have been employed to designate the emitter, base, and collector electrodes of each of the transistors. It should be noted that the invention is not restricted to the use of PNP type transistors, but may employ other types in accordance with established design procedures well known to those skilled in the art.

The positive and negative supply voltage for the transistors listed respectively in order of increasing absolute magnitude are +V, ++V and −V, −−V.

The steering signal source 25 applies, upon command, either of two voltage levels to the base electrode of the steering transistor 20. Transistor 20 is caused to assume either of two operational states, namely, conducting or non-conducting, depending upon the voltage level of the signals applied thereto from steering source 25. The control signal source 15 normally supplies a voltage level to the base of control transistor 10 which causes the transistor to saturate. Upon command, the control source 15 impresses a voltage pulse of the proper polarity, amplitude and duration to the base of transistor 10 to halt the conduction thereof for a predetermined period. Accordingly, transistor 10 also assumes an operational state in accordance with the voltage level of the signal supplied by control source 15.

The operation of the driver circuit of FIG. 1 will be described for the various conditions of operation identified in FIG. 2 as cases I to IV, inclusive.

In case I the control signal source 15 applies, through its internal impedance, a voltage level to the base of transistor 10 which is negative with respect to the supply potential +V. Transistor 10 is saturated and reference point A, which is also the collector terminal of transistor 10, is substantially at the +V voltage level. It is assumed that transistor 20 is not conducting because of the magnitude and polarity of the signal applied to its base by source 25 via its internal impedance. Obviously this latter signal must be positive with respect to the emitter supply voltage ++V. Under these conditions, namely, transistor 10 conducting and transistor 20 not conducting, both drive transistors 30 and 40 are Off. The voltage levels +V on the base of transistor 30 and ++V on the base of transistor 40 keep the respective transistors Off and no current flows through the load 55.

In case II it is assumed that control transistor 10 is conducting heavily, as hereinbefore described. In this instance, however, steering transistor 20 is also conducting in response to the voltage applied to its base by source 25. This steering voltage must be negative with respect to the supply voltage ++V. As in case I the potential at point A is substantially +V. Current flows from the ++V supply into the emitter electrode of transistor 20 in the direction of the arrow symbol, out of the base of transistor 20 to the signal source 25, and out of the collector electrode of transistor 20 to the −−V supply. The collector junction of transistor 20 is forward biased by the voltage on its collector electrode and as a result both the base and emitter electrodes of transistor 20 are held substantially at +V potential. The voltage level +V at point A appears on the base electrode of transistor 30 and prevents the conduction thereof. Likewise, transistor 40 is biased Off by the voltage at point B which has a magnitude intermediate that of +V and ++V. Accordingly no load current flows. It should be apparent from the foregoing that the biasing of transistor 10 On, precludes the flow of current in either direction through the load.

In case III both the control transistor 10 and the steering transistor 20 are biased Off due to the respective signals applied to their base electrodes by control source 15 and steering source 25. Drive transistor 40 is biased Off by the ++V potential appearing on its base. The negative potential −−V appearing on the base of transistor 30 biases the transistor to conduction and load current $I_{30}$ flows from ground, through the load in the direction of the arrow, into the emitter electrode of transistor 30, out of the base electrode of transistor 30 to the −−V supply and out of the collector electrode of transistor 30 to the −V supply. With respect to the grounded terminal of load 55, the reference point C is negative as a result of current $I_{30}$.

Case IV is concerned with the flow of load current in a direction opposite to that of case III. Again it is assumed that the control transistor 10 is Off, thereby allowing the steering transistor 20 to select one or the other of the drive transistors. It is further assumed that transistor 20 has been biased On by the voltage level supplied from steering source 25. The conduction of transistor 20 causes point A and the base of transistor 30 to become positive with respect to the emitter of transistor 30, thereby biasing said latter transistor Off. Concurrently there is a sufficient voltage drop across resistor 21 to cause the potential at reference point B, which is the base terminal of transistor 40, to become negative with respect to the +V potential on the emitter of transistor 40. Transistor 40 is turned On and current flows from the +V supply into the emitter of transistor 40, out of the base of transistor 40 and into the emitter electrode of transistor 20. The collecor current of transistor 40 corresponds to the load current $I_{40}$ which flows to ground in the direction of the arrow. Reference point C becomes slightly positive with respect to ground as a result of current $I_{40}$ flowing through the load. The voltage level at point A is designed to remain positive with respect to the emitter potential of transistor 30 to preclude the conduction of said latter transistor, taking into account the voltage developed at point C by current $I_{40}$. Thus load current can flow in the instant circuit only when the control transistor 10 is biased Off—the direction of flow of said current being a function of transistor 20, as previously explained.

Considering briefly the use of the present circuit as a source of information write current in "word-organized" matrix memories, the control signal source 15 would be adapted to provide a bias potential sufficient to keep transistor 10 On throughout the memory read cycle and to pulse transistor 10 Off during the write cycle when "write current" is applied to the magnetic elements of the memory. The steering signal source 25 may conveniently be a flip-flop circuit— the base of transistor 20 being coupled to one of the flip-flop output terminals. The flip-flop associated with each memory plane would be preset to either of its stable states in accordance with the binary information to be written into the selected digit core of each plane. Depending upon the state of the flip-flop and the corresponding voltage level existing on the base of transistor 20 when control transistor 10 is pulsed Off by source 15, information write current will be supplied by transistors 30 or 40 which will either add or subtract from the switching effect of the write current in each memory plane, as hereinbefore explained.

While it will be understood that the circuit specifications for the basic bidirectional current driver shown may vary according to the design or application, the following circuit parameters are included by way of example:

| | | |
|---|---|---|
| Supply voltage: | | |
| +V | volts | +8 |
| ++V | do | +12 |
| −V | do | −8 |
| −−V | do | −15 |
| Transistor: | | |
| 10 | | PNP-type 2N582 |
| 20 | | PNP-type 2N426 |
| 30 and 40 | | PNP-type 2N428 |
| Resistors: | | |
| 11 | ohms | 620 |
| 21 | do | 430 |
| 22 | do | 100 |
| 31 | do | 20 |
| 41 | do | 20 |
| Load 55 | | 5 ohms and 10 $\mu$h. in series |

The voltage levels supplied by the control signal source 15 are ground potential for keeping transistor 10 On and a voltage pulse of +8.7 volts to turn transistor 10 Off. Both of these potentials are applied to the base of transistor 10 through the series 2,000 ohm impedance of source 15. The voltage levels available from the steering signal source 25 are ground potential for keeping transistor 20 On, and a voltage level +13 volts for keeping transistor 20 Off. Both of these potentials are applied to the base of transistor 20 through the series 2,000 ohm impedance of the source 25. A driver circuit having the foregoing circuit parameters will provide a load current of approximately plus or minus 300 milliamps.

Since other modifications varied to fit particular operating requirements and environments will be apparent to those skilled in the art, the invention is not considered limited to the example chosen for purposes of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A pulse forming circuit for delivering current to a load comprising: first and second current amplifying devices for supplying respectively current of opposite polarities to said load, said first and second current devices each having an input, output, and control electrode, said load having a pair of terminals, means coupling the output electrodes respectively of said first and second current devices to a common load terminal, means coupling the other of said load terminals to a source of reference potential, a third current amplifying device having an input, output and control electrode, the output and input electrodes of said third current device being coupled respectively to the control electrodes of said first and second current devices, the control electrode of said third current device being adapted to be pulsed from a source of steering signals whereby said third device is driven to either a conducting or a non-conducting state, the state of said third current device tending to establish bias conditions for effecting the conduction of either said first or said second current device, a fourth current amplifying device having an input, output and control electrode, the output electrode of said fourth device being coupled in common to the output electrode of said third device and the control electrode of said first device, the control electrode of said fourth current device being adapted to be pulsed from a source of control signals whereby said fourth device is driven to either a conducting or a non-conducting state, the states of said fourth current device establishing distinct bias conditions within said pulse forming circuit, a first of said conditions precluding the conducton of either said first or second current devices regardless of the state of said third device, and the second of said bias conditions permitting the conduction of either said first or second transistor in accordance with the bias condition established by said third current device, whereby current pulses are supplied to said load.

2. A pulse forming circuit as defined in claim 1 wherein said current amplifying devices are transistors and said input, output and control electrodes are respectively the emitter, collector and base electrodes of each of said transistors.

3. A driver circuit for delivering bidirectional current pulses to a load comprising: first and second PNP transistors for supplying respectively current pulses of opposite polarities to said load, said first and second transistors each having an emitter, a collector and a base electrode, said load having a pair of terminals, circuit means coupling the emitter and the collector electrodes respectively of said first and second transistors to a common load terminal, means coupling the other of said load terminals to a source of reference potential, a third PNP transistor having an emitter, a collector, and a base electrode, the collector and emitter electrodes of said third transistor being coupled respectively to the base electrodes of said first and second transistors, the base electrode of said third transistor being adapted to be pulsed from a source of steering signals whereby said third transistor is biased to either a conducting or a non-conducting state, the conducting state of said third transistor tending to establish bias conditions for effecting the conduction of said second transistor and the non-conduction of said first transistor, the non-conducting state of said third transistor tending to establish bias conditions for effecting the conduction of said first transistor and the non-conduction of said second transistor, a fourth PNP transistor having an emitter, a collector, and a base electrode, the collector electrode of said fourth transistor being coupled to both said collector electrode of said third transistor and said base electrode of said first transistor, the base electrode of said fourth transistor being adapted to be pulsed from a source of control signals whereby said fourth transistor is biased to either a conducting or a non-conducting state, the conducting state of said fourth transistor establishing bias conditions which preclude the conduction of either said first or second transistor regardless of the state of said third transistor, and the non-conducting state of said fourth transistor permitting the conduction of either said first or second transistor in accordance with the bias conditions established by said third transistor, whereby current pulses are supplied to said load.

4. A pulse forming circuit for delivering current to a load, comprising: first and second drive means coupled in common to said load for supplying respectively load current pulses of opposite polarity, steering means coupled to both said drive means, said steering means being adapted to be pulsed from a source of steering signals whereby said steering means is caused to assume either of two operational states, the operational states of said steering means tending to condition respectively said first and second drive means for supplying current to said load, control means coupled to both said first drive means and said steering means, said control means being adapted to be pulsed from a source of control signals whereby said control means is caused to assume either of two operational states, a first of the operational states of said control means establishing circuit conditions which preclude the conditioning of either said first or second drive means by said steering means regardless of the operational state of the last means, and the second of the operational states of said control means establishing circuit conditions which permit the conditioning of either said first or second drive means by said steering means in accordance with the operational state of the last means, whereby current pulses are supplied to said load.

5. A pulse forming circuit for delivering current to a load, comprising: first and second current amplifying devices for supplying respectively current of opposite polarities to said load, said load having a pair of terminals, means coupling both said first and second current devices to a common load terminal, means coupling the other terminal of said load to a source of reference potential, a third current amplifying device coupled to both said first and second amplifying devices, said third amplifying device being adapted to be pulsed from a source of steering signals whereby said third amplifying device is caused to assume either of two operational states, the operational states of said third amplifying device tending to condition respectively said first and second amplifying devices for supplying current to said load, a fourth current amplifying device coupled to both said first amplifying device and said third amplifying device, said fourth amplifying device being adapted to be pulsed from a source of control signals whereby said fourth amplifying device is caused to assume either of two operational states, a first of the operational states of said fourth amplifying device establishing circuit conditions which preclude the conditioning of either said first or second amplifying device by said third amplifying device regardless of the operational state of the last device, and the second of the operational states of said fourth amplifying device establishing circuit conditions which permit the conditioning of ether said first or second amplifying device by said third amplifying device in accordance with the operational state of the last device, whereby current pulses are supplied to said load.

6. A pulse forming circuit for delivering current to a load, comprising: first and second transistors for supplying respectively current of opposite polarities to said load, said load having a pair of terminals, means coupling both said first and second transistors to a common load terminal, means coupling the other terminal of said load to a source of reference potential, a third transistor coupled to both said first and second transistors, said third transistor being adapted to be pulsed from a source of steering signals whereby said third transistor is biased to either of two operational states, the operational states of said third transistor tending to establish bias conditions for effecting the conduction respectively of said first and second transistors, a fourth transistor coupled to both said first transistor and said third transistor, said fourth transistor being adapted to be pulsed from a source of control signals whereby said fourth transistor is biased to either of two operational states, a first of the operational states of said fourth transistor establishing bias conditions which preclude the conduction of either said first or second transistor regardless of the operational state of said third transistor, and the second of the operational states of said fourth transistor permitting the conduction of either said first or second transistor in accordance with the bias conditions established by said third transistor, whereby current pulses are supplied to said load.

7. A pulse forming circuit for delivering current to a load, comprising: first and second PNP transistors for supplying respectively current of opposite polarity to said load, said load having a pair of terminals, circuit means coupling both said first and second transistors to a common load terminal, means coupling the other terminal of said load to a source of reference potential, a third PNP transistor coupled to both said first and second transistors, said third transistor being adapted to be pulsed from a source of steering signals whereby said third transistor is biased to either a conducting or a non-conducting state, the conducting state of said third transistor tending to establish bias conditions for effecting the conducion of said second transistor and the non-conduction of said first transistor, the non-conducting state of said third transistor tending to establish bias conditions for effecting the conduction of said first transistor and the non-conduction of said second transistor, a fourth PNP transistor coupled to both said first transistor and said third transistor, said fourth transistor being adapted to be pulsed from a source of control signals whereby said fourth transistor is biased to either a conducting or a non-conducting state, the conducting state of said fourth transistor establishing bias conditions which preclude the conduction of either said first or second transistor regardless of the state of said third transistor, and the non-conducting state of said fourth transistor establishing bias conditions which permit the conduction of either said first or second transistor in accordance with the bias conditions established by said third transistor, whereby current pulses are supplied to said load.

References Cited in the file of this patent

UNITED STATES PATENTS

| | | |
|---|---|---|
| 2,846,630 | Boyle et al. | Aug. 5, 1958 |
| 2,847,519 | Aronson | Aug. 12, 1958 |
| 2,885,149 | Clapper | May 5, 1959 |
| 2,914,669 | Wright et al. | Nov. 24, 1959 |

FOREIGN PATENTS

| | | |
|---|---|---|
| 643,471 | Great Britain | Sept. 20, 1950 |